United States Patent [19]

Inoue

[11] Patent Number: 4,673,857
[45] Date of Patent: Jun. 16, 1987

[54] METHOD FOR DRIVING A TURN DETECTOR CIRCUIT WHICH DETECTS THE TURN OF A STEP MOTOR

[75] Inventor: Yuichi Inoue, Tokyo, Japan

[73] Assignee: Seiko Instruments & Electronics Ltd., Tokyo, Japan

[21] Appl. No.: 784,240

[22] Filed: Oct. 4, 1985

[30] Foreign Application Priority Data

Oct. 16, 1984 [JP] Japan .................................. 54-216581

[51] Int. Cl.$^4$ ............................................. H02P 8/00
[52] U.S. Cl. .................................... 318/696; 318/685; 368/157
[58] Field of Search ................. 318/696, 685; 368/157

[56] References Cited

U.S. PATENT DOCUMENTS

| | | | |
|---|---|---|---|
| 4,321,520 | 3/1982 | Veda et al. ........................ | 318/696 |
| 4,321,521 | 3/1982 | Veda et al. ........................ | 318/696 |
| 4,352,172 | 9/1982 | Veda et al. ........................ | 368/76 |

Primary Examiner—William M. Shoop, Jr.
Assistant Examiner—Saul M. Bergmann
Attorney, Agent, or Firm—Bruce L. Adams; Robert E. Burns; Emmanuel J. Lobato

[57] ABSTRACT

A detection circuit having a normally open low impedance loop comprised of a step motor coil and a low impedance element, and a normally open high impedance loop comprised of the step motor coil and a high impedance element is used to detect whether or not the step motor has angularly advanced in response to application of a drive pulse to the step motor coil. The detection circuit is driven by alternately switching between the low and high impedance loops to thereby alternately close the loops to enable detection of a voltage induced in the step motor coil indicative of whether or not the step motor rotor has angularly advanced in response to the application of a drive pulse to the step motor coil, and the alternate switching between the low and high impedance loops is controlled so as to prevent occurrence of a condition in which the low and high impedance loops are both open simultaneously during detection of the induced voltage. By driving the detection circuit in this manner, the induced voltage remains more stable, detection errors are avoided, and the integrated circuitry of the detection circuit can be more easily designed and fabricated as no particular consideration need be given to the gate capacitance of the switching transistors of the detection circuit.

9 Claims, 11 Drawing Figures

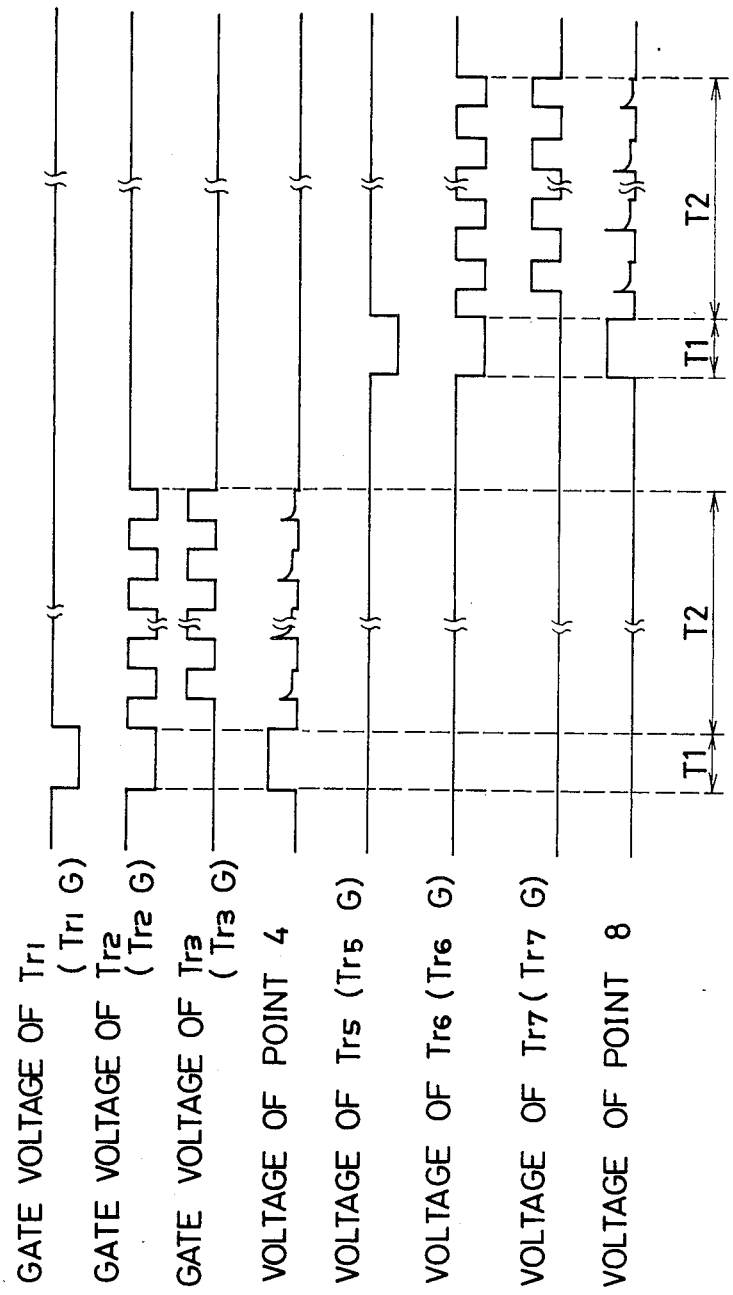

METHOD FOR DRIVING A TURN DETECTOR CIRCUIT WHICH DETECTS THE TURN OF A STEP MOTOR

BACKGROUND OF THE INVENTION

1. Field of the invention

The present invention relates to a method for driving a turn detector circuit which detects the turning of a step motor used in timepieces such as wristwatches.

2. Description of the Prior Art

FIGS. 1, 2 and 3 respectively illustrate conventional driving and detecting circuits, a step motor, and a timing chart thereof. In operation, at a timing T1, a drive pulse is applied to an excitation coil (hereinafter simply referred to as coil) 9. A p-type MOSFET 1 (hereinafter simply referred to as Tr) and an n-type MOSFET 6 (hereinafter simply referred to as Tr) only are rendered conductive, and an electric current flows from the power source through a path indicated by arrow 14. At a timing T2 for detecting the turning or angular advancement of the motor rotor, Tr 6 is conductive at all times, and Tr 2 and Tr 3 are rendered conductive and nonconductive alternately. Namely, closed inpedance loops 15 and 16 are alternately established, and a voltage VRS is induced in the coil due to the motion of a rotor 17 as represented by a voltage at point 4 in FIG. 3. The voltage VRS is usually about 2.0 volts (current flows into VDD via a parasitic diode in the IC, and is clamped to a forward voltage of VDD+ parasitic diode) when the rotor turns, with VSS being set at 0 volts, and is from 0.3 to 1.2 volts when the rotor does not turn. The difference between VRS when the rotor turns and that when the rotor does not turn is detected by comparators 10 and 11, thereby to detect the turn.

The above method for driving a turn detector circuit to detect whether a rotor turns or not is exemplified in U.S. Pat. No. 4,326,278 issued Apr. 20, 1982 to Shida et al.

The voltage VRS, however, is affected by quite many factors such as the shapes and materials of the rotor 17 and stator 18, the inductance and resistance of the coil 9, the resistances of resistors 12 and 13, the switching timing of Tr's 2 and 6, the stray capacitance at both ends 4 and 8 of the coil 9, and the switching timing T2. The voltage VRS varies due to these factors, and the rotor 17 is often detected to be not turning when it actually is turning, or is detected, to be turning when it is not turning. This is a serious problem causing the consumption of electric power to increase or causing the watch to run slow.

The rotors, stators and coils are typically formed in small sizes in accordance with the recent trend toward constructing the timepieces in compact sizes thereby resulting, however, in making the voltage VRS higher. Namely, though the rotor is not really turning, it is sometimes detected that the rotor is turning, and consequently the displayed time lags behind the real or actual time. Among the many factors that affect the voltages VRS, the switching timings of Tr's 2, 3 and Tr's 6, 7 during the timing T2 have heretofore been so selected that Tr 3 or 7 is rendered conductive just when Tr 2 or 6 is rendered non-conductive as shown in FIG. 4A. However, though the switching timing can be selected just as mentioned above, the time is delayed by small amounts due to wiring capacity or capacitance and gate capacity or capacitance in the IC. There will be no problems when the signals applied to the gates of Tr's 2 and 3 are delayed by an equal amount, or when the signal applied to Tr 2 is delayed more than the signal applied to Tr 3 as shown in FIG. 4C. However, a large voltage VRS is induced when the signal applied to Tr 3 is more delayed than the signal applied to Tr 2 as shown in FIG. 4B. Namely, at the time T3 of FIG. 4B where both the Tr 2 and Tr 3 are rendered non-conductive, there is formed no closed loop, and a high voltage VRS is induced.

SUMMARY OF THE INVENTION

In order to solve the above-mentioned problems according to the present invention, the timing at which Tr 2 or Tr 6 is rendered non-conductive is logically deviated from the timing at which Tr 3 or Tr 7 is rendered conductive, so that Tr 2 and Tr 3 or Tr 6 and Tr 7 will not be simultaneously rendered non-conductive, as occurs at the time T3 of FIG. 4B.

An object of this invention is to provide a method for driving a turning or angular advancement detector circuit which detects the turn of a rotor of a step motor having the rotor, a coil and stator, by connecting a high impedance element to the coil by operating a first switching means and connecting a low impedance element to the coil by operating a second switching means, alternately, wherein the method comprises the steps of applying a first signal to the first switching means for connecting the high impedance element to the coil, applying a second signal to said second switching means for connecting the low impedance element to the coil and then applying a third signal to the second switching means for disconnecting the low impedance element from the coil.

BRIEF DESCIPTION OF THE DRAWINGS

FIG. 3 is a conventional timing chart for the circuitry shown in FIG. 1.

PREFERRED EMBODIMENTS OF THE INVENTION

Figure 5:
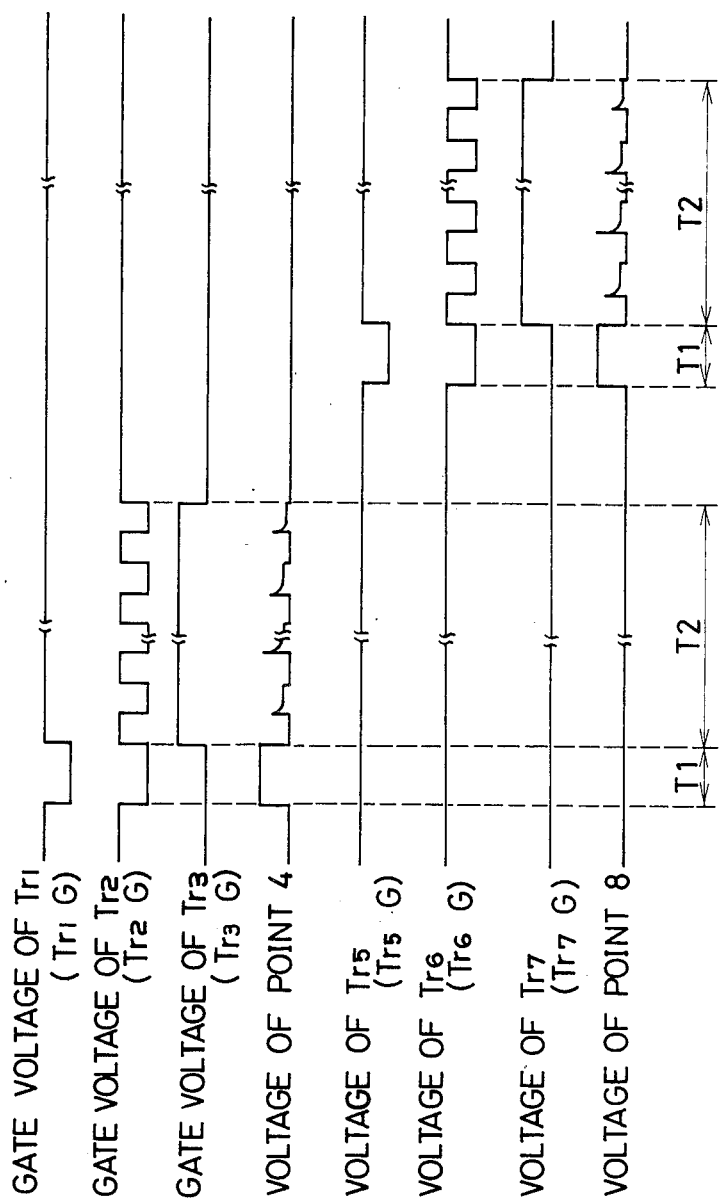
FIG. 5 is a diagram of a timing chart according to the present invention.
Figure 6A:
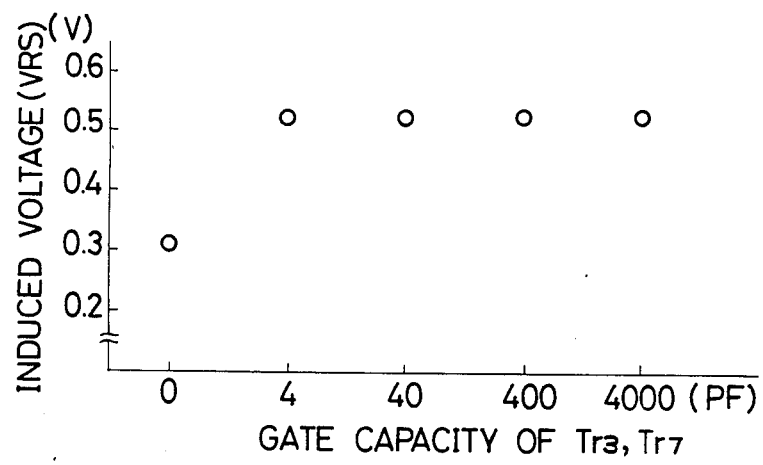
FIGS. 6A and 6B are diagrams showing experimental results of the conventional driving method of a turn detector circuit and the driving method of the present invention, respectively.
Figure 6B:
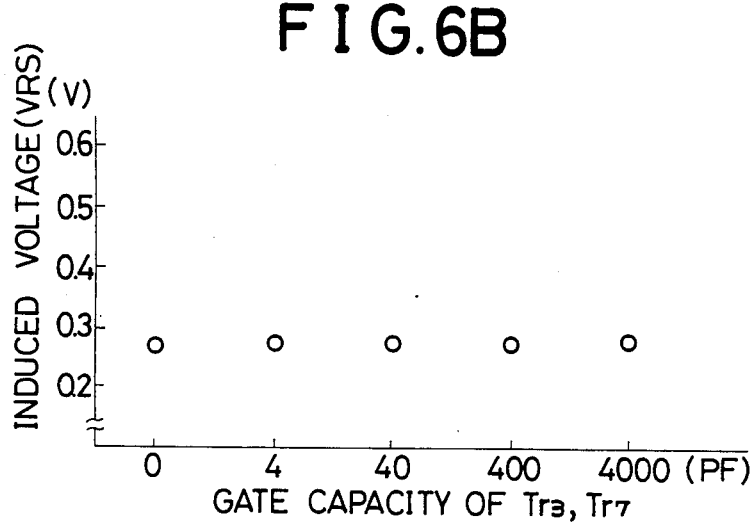

FIGS. 6A and 6B show experimental results which prove the effectiveness of the present invention. FIG. 6A shows the voltage VRS the gate capacity or of capacitance of Tr 3 or Tr 7 is increased in the conventional circuit logic, i.e., in the logic where Tr 2 and Tr 3 or Tr 6 and Tr 7 are alternately rendered conductive and non-conductive as in FIG. 3. It will be understood that the voltage VRS suddenly increases at a point where the delay increases as a result of increasing the gate capacity of Tr 3 or Tr 7. FIG. 6B shows the voltage VRS when the capacity or capacitance of Tr 3 or Tr 7 is increased in the logic of the present invention, i.e., in the logic where Tr 3 or Tr 7 is maintained conductive throughout the timing T2 for switching Tr 2 or Tr 6 as shown in FIG. 5. it will be recognized that the voltage VRS does not change even when the gate capacity of Tr 3 or Tr 7 is increased.

Figure 7:
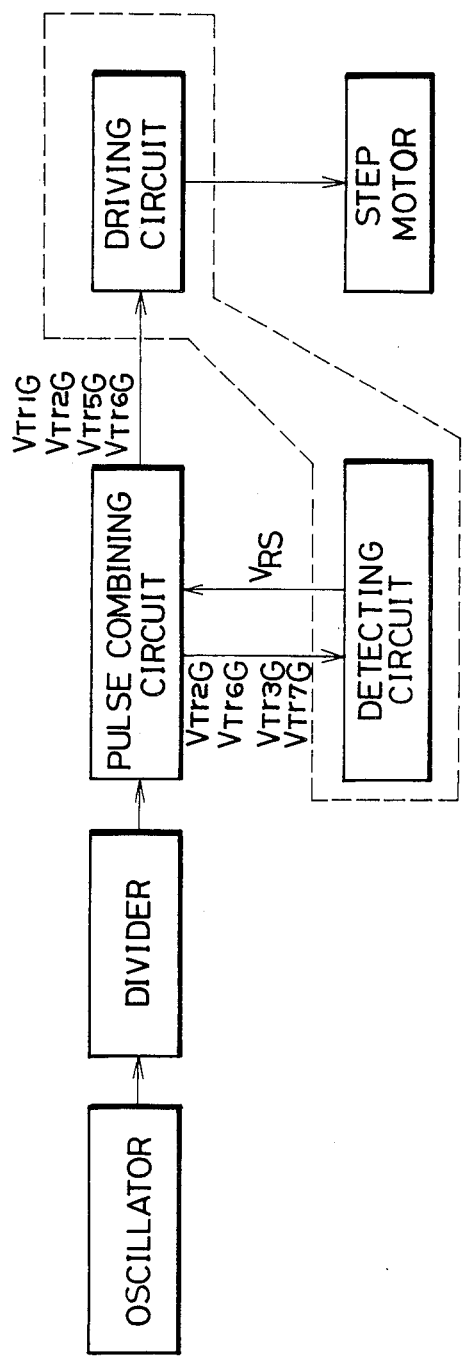
FIG. 7 is a block circuit diagram of an electronic timepiece for producing the time chart waveforms as shown in FIG. 5.

FIG. 7 is a block circuit diagram of an electronic timepiece for producing the time chart waveforms as shown in FIG. 5.

Figure 1:
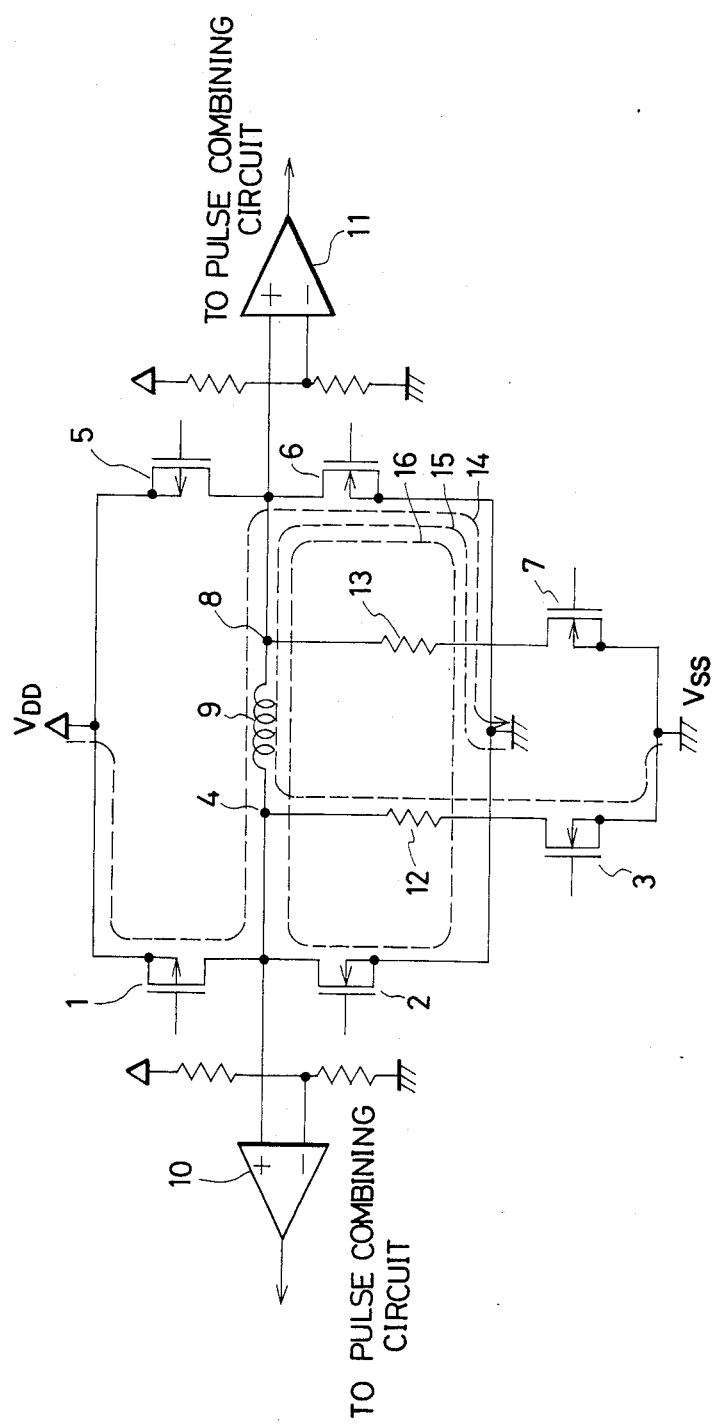
FIG. 1 show a prior art driving circuit and detecting circuit for a step motor of the type with which the present invention is concerned.
Figure 2:
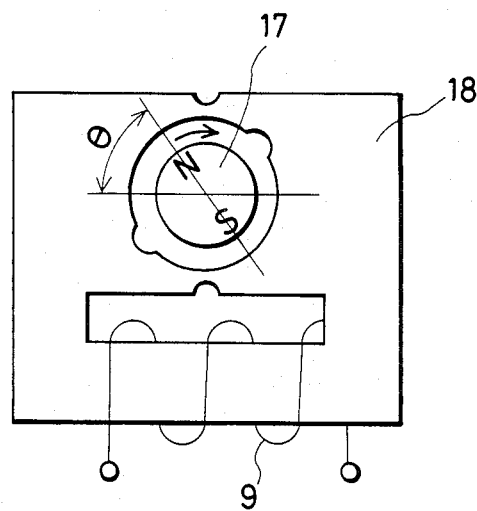
FIG. 2 shows a prior art step motor of the type with which the present invention is concerned.
Figure 4A:
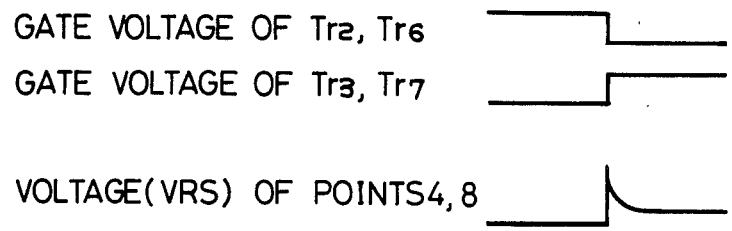
FIGS. 4A, 4B, and 4C and 4D are explanatory diagrams which explain the change of the voltage VRS caused by a deviation of the switching timing during a time T2 for detecting the turn of the stepmotor.
Figure 4B:
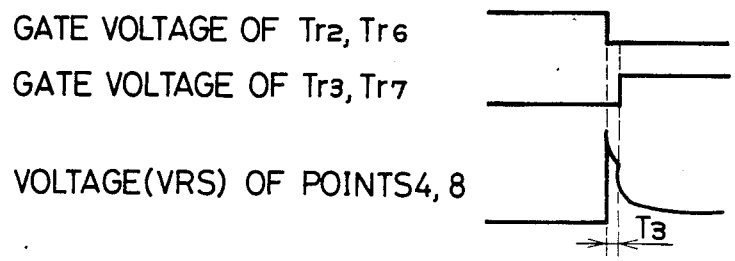
Figure 4C:
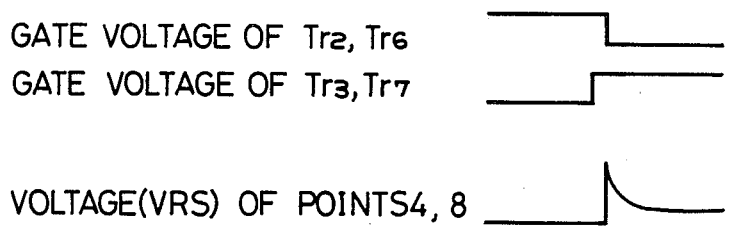
Figure 4D:
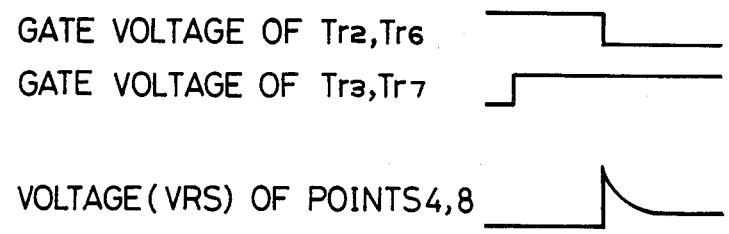

A pulse combining circuit provides the gate voltage $V_{Tr1G}$ to Tr1, the gate voltage $V_{Tr2G}$ to Tr2, the gate voltage $V_{Tr5G}$ to Tr5 and the gate voltage $V_{Tr6G}$ to Tr6 during the time T1 and provides the gate voltage $V_{Tr1G}$ to Tr1, the gate voltage $V_{Tr2G}$ to Tr2, the gate voltage $V_{Tr3G}$ to Tr3, the gate voltage $V_{Tr5G}$ to Tr5, the gate voltage $V_{Tr6G}$ to Tr6 and the gate voltage $V_{Tr7G}$ to Tr7 during the, time, T2., In FIG. 7, a detector circuit (shown in dashed lines) having a driving circuit and a detecting circuit like those shown in FIG. 1 is used.

According to the present invention as described above, the voltage VRS remains stable and helps prevent erroneous detection. Moreover, the time is not delayed by, the wiring capacity or the gate capacity, thereby presenting a significant advantage from the standpoint of, designing and producing the IC's. That is, in designing the IC s, there is no need of giving attention to the gate capacity of, Tr 2 or Tr 6 and Tr3 or Tr7, or to the delay factors of the circuit elements up to the gates thereof and, hence, there is no need of controlling or checking such items in manufacturing the IC's.

What is claimed is:

1. In a method for driving a turn detector circuit which detects the turn of a rotor of a step motor having the rotor, a coil and a stator by connecting a high impedance element electrically to said coil by operating a first switching means and connecting a low impedance element electricallly to said coil by operating a second switching means, alternately, the improvement comprising the steps of: applying a first signal to said first switching means for connecting said high impedance element to said coil; applying a second signal to said second switching means for connecting said low impedance element to said coil; and then applying a third signal to said second switching means for disconnecting said low impedance element from said coil while said high impedance element is connected to said coil during the time of detecting the turn of said rotor.

2. In a method for driving a turn detector circuit as claimed in claim 1; wherein said first signal and said second signal are alternately applied to said first switching means and said second switching means.

3. In a method for driving a turn detector circuit as claimed in claim 1; wherein said low impedance element comprises a low resistance element and said high impedance element comprises a high resistance element.

4. In a method for driving a turn detector circuit which detects the turn of a rotor of a step motor having the rotor, a coil and a stator, which has a low impedance loop including a first switching means, a second switching means and said coil, and a high impedance loop including said first switching means, a third switching means and said coil, said first switching means being connected to one terminal of said coil, said second and third switching means being connected to the other terminal of said coil, and which operates said first, second and third switching means during turn detection of said turn detector circuit to alternately form and release the two impedance loops, the improvement comprising the steps of: forming one of the two impedance loops before releasing the other impedance loop; maintaining the one impedance loop while releasing the other impedance loop; and forming the other impedance loop before releasing the one impedance loop.

5. In a method for driving a turn detector circuit which detects the turn of a rotor of a step motor having the rotor, a coil and a stator, which has a low impedance loop including a first switching means, a second switching means and said coil, and a high impedance loop including said second switching means, a third switching means and said coil, said first and third switching means being connected to one terminal of said coil, said second switching means being connected to the other terminal of said coil, and which operates said first, second and third switching means during turn detection of said turn detector circuit to alternately form and release the two impedance loops, the improvement comprising the steps of: forming one of the two impedance loops before releasing the other impedance loop; maintaining the one impedance loop while releasing the other impedance loop; and forming the other impedance loop before releasing the one impedance loop.

6. A method of operating a detection circuit for detecting whether or not a rotor of a step motor has angularly advanced in response to application of a drive pulse to a coil of the step motor, the detection circuit having a normally open low impedance loop comprised of the step motor coil and a low impedance element and a normally open high impedance loop comprised of the step motor coil and a high impedance element, the method comprising the steps of: alternately switching between the low and high impedance loops to thereby alternately close the loops to enable detection of a voltage induced in the step motor coil indicative of whether or not the step motor rotor has angularly advanced in response to application of a drive pulse to the step motor coil; and controlling the switching between the low and high impedance loops to prevent occurrence of a condition in which the low and high impedance loops are both open simultaneously during detection of the voltage induced in the step motor coil.

7. A method according to claim 6; wherein the controlling step comprises switching closed the high impedance loop before switching open the low impedance loop.

8. A method according to claim 6; wherein the controlling step comprises switching closed the low impedance loop before switching open the high impedance loop.

9. A method according to claim 6; wherein the controlling step comprises alternately switching between the low and high impedance loops in such manner that the closed impedance loop which is to be switched open is maintained closed until after the other impedance loop is switched closed.

* * * * *